United States Patent
Heu et al.

(10) Patent No.: US 9,495,600 B2
(45) Date of Patent: Nov. 15, 2016

(54) PEOPLE DETECTION APPARATUS AND METHOD AND PEOPLE COUNTING APPARATUS AND METHOD

(71) Applicant: SAMSUNG SDS Co., Ltd., Seoul (KR)

(72) Inventors: Jun Hee Heu, Seoul (KR); Jong Hang Kim, Seoul (KR);
(Continued)

(73) Assignee: SAMSUNG SDS CO., LTD., Seoul (KR)

(*) Notice: Subject to any disclaimer, the term of this patent is extended or adjusted under 35 U.S.C. 154(b) by 56 days.

(21) Appl. No.: 14/291,948

(22) Filed: May 30, 2014

(65) Prior Publication Data
US 2014/0355829 A1 Dec. 4, 2014

(30) Foreign Application Priority Data

May 31, 2013 (KR) .......................... 10-2013-0062261

(51) Int. Cl.
*G06K 9/32* (2006.01)
*G06K 9/00* (2006.01)
(Continued)

(52) U.S. Cl.
CPC ......... *G06K 9/00778* (2013.01); *G06K 9/2054* (2013.01); *G06K 9/32* (2013.01);
(Continued)

(58) Field of Classification Search
USPC ....................................................... 382/103
See application file for complete search history.

(56) References Cited

U.S. PATENT DOCUMENTS

2005/0201612 A1   9/2005  Park et al.
2010/0092030 A1*  4/2010  Golan .................. G06K 9/3241
                                              382/103
(Continued)

FOREIGN PATENT DOCUMENTS

JP        10-049718 A        2/1998
KR    10-2004-0079550 A      9/2004
(Continued)

OTHER PUBLICATIONS

Communication dated Sep. 17, 2014 issued by Korean Intellectual Property Office in counterpart Korean Application No. 10-2013-0062261.
(Continued)

*Primary Examiner* — Stephen R Koziol
*Assistant Examiner* — Delomia L Gilliard
(74) *Attorney, Agent, or Firm* — Sughrue Mion, PLLC

(57) ABSTRACT

According to an aspect of the present invention, there is provided a people counting apparatus including: a reception unit which receives a video of an area including an entrance captured by a video capture device; a line setting unit which sets an inline at the entrance and sets an outline such that a specific region is formed on a side of the inline; a detection unit which detects moving objects in the video using information differences between frames of the received video and detects human moving objects among the detected moving objects; a tracking unit which tracks the movement of each of the detected moving objects; and a counting unit which determines whether each of the moving objects passed the inline and the outline based on the tracked movement of each of the moving objects and counts the number of people based on the determination result.

12 Claims, 11 Drawing Sheets

(72) Inventors: Jeong Seon Yi, Seoul (KR); Yeon Hee Kwon, Seoul (KR); Sang Hak Lee, Seoul (KR)

(51) Int. Cl.
*G06T 7/20* (2006.01)
*G06K 9/20* (2006.01)

(52) U.S. Cl.
CPC ......... *G06T 7/20* (2013.01); *G06K 2009/3291* (2013.01); *G06T 2207/30242* (2013.01)

(56) References Cited

U.S. PATENT DOCUMENTS

| | | | | |
|---|---|---|---|---|
| 2011/0274315 | A1* | 11/2011 | Fan | G06K 9/00771 382/103 |
| 2012/0057640 | A1* | 3/2012 | Shi | H04N 19/52 375/240.26 |
| 2012/0057748 | A1* | 3/2012 | Katano | G06T 7/204 382/103 |
| 2013/0155229 | A1* | 6/2013 | Thornton | H04N 7/18 348/143 |
| 2014/0010456 | A1* | 1/2014 | Merler | G06T 7/208 382/191 |
| 2014/0037147 | A1* | 2/2014 | Yoshio | G06T 7/0081 382/107 |
| 2014/0139660 | A1* | 5/2014 | Zhu | G06K 9/00369 348/143 |
| 2015/0009332 | A1* | 1/2015 | Fuhrmann | G08B 21/22 348/155 |

FOREIGN PATENT DOCUMENTS

| | | |
|---|---|---|
| KR | 10-0519782 B1 | 10/2005 |
| KR | 10-2010-0121817 A | 11/2010 |
| KR | 10-1064927 B1 | 9/2011 |

OTHER PUBLICATIONS

Lefloch, "Real-Time People Counting system using Video Camera", Master of Computer Science, Image and Artificial Intelligence, 2007, 60 pages total.

Communication dated Dec. 22, 2014, issued by the Korean Intellectual Property Office in counterpart Korean Application No. 10-2013-0062261.

Chuanying Gao, "Research of people counting by video sequence based on DSP", China Master's Theses Full-text Database, 2011, No. 4.

Communication dated Jul. 14, 2016, issued by the State Intellectual Property Office of P.R. China in counterpart Chinese application No. 201410234167.4.

* cited by examiner

MOVING OBJECT DETECTION APPARATUS (100)

PEOPLE DETECTION APPARATUS (300)

PEOPLE TRACKING APPARATUS (500)

PEOPLE COUNTING APPARATUS (600)

COUNTING UNIT (610)

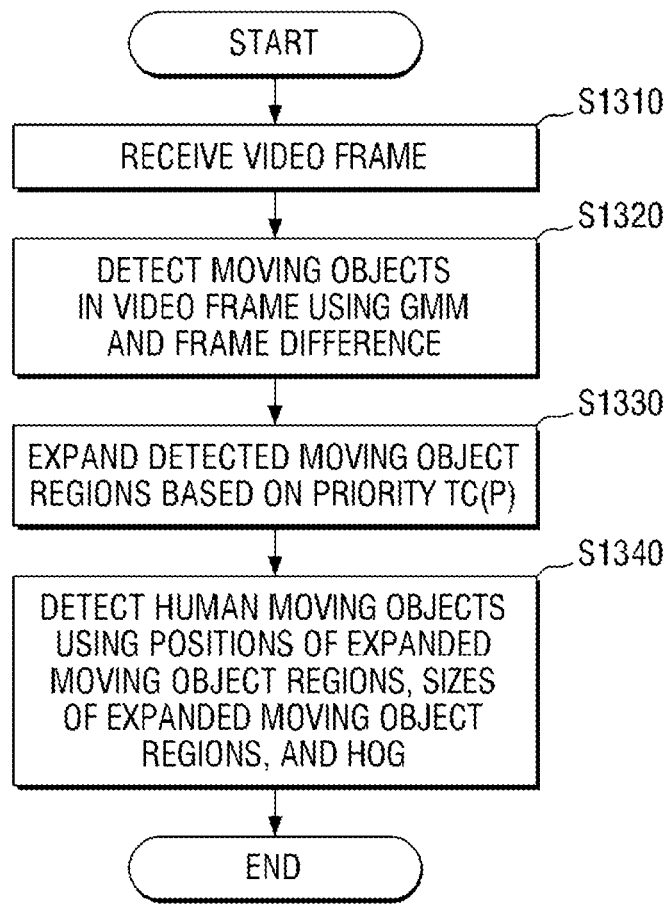

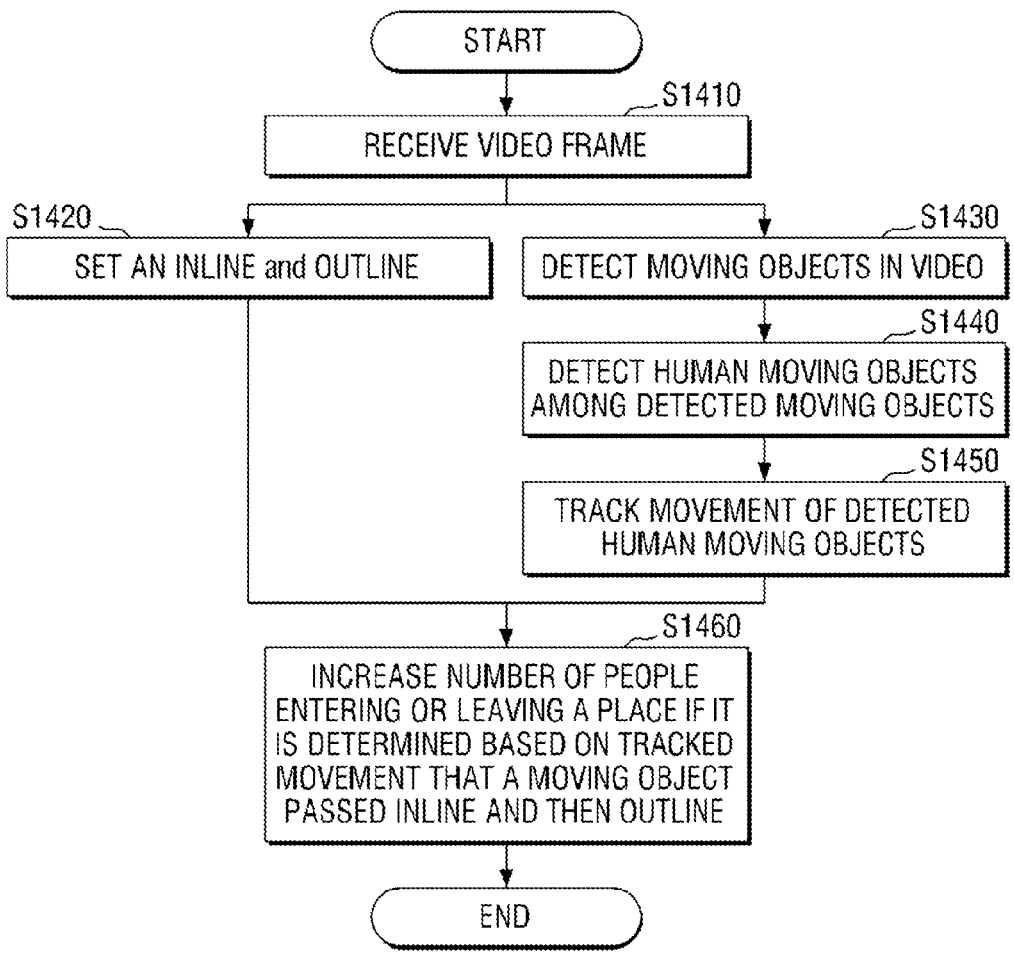

PEOPLE DETECTION APPARATUS AND METHOD AND PEOPLE COUNTING APPARATUS AND METHOD

This application claims priority from Korean Patent Application No. 10-2013-0062261 filed on May 31, 2013 in the Korean Intellectual Property Office, the disclosure of which is incorporated herein by reference in its entirety.

BACKGROUND OF THE INVENTION

1. Field of the Invention

The present invention relates to a people detection apparatus and method and a people counting apparatus and method, and more particularly, to a people counting apparatus and method employed to count the number of people entering and leaving a place using a video captured by a video capture device such as a closed circuit television (CCTV).

2. Description of the Related Art

Counting the number of people entering a shop is one of the important indices that measure a convergence ratio which is one of the important marketing elements. Currently, however, counting the number of people is being carried out manually. Counting the number of people with the human eye requires a lot of time and labor costs and does not guarantee accuracy.

Counting the number of people cannot only be used in shop management or as a marketing element but also be widely used in various fields. Therefore, it is required to develop an automated and highly accurate people counting algorithm.

SUMMARY OF THE INVENTION

Aspects of the present invention provide a moving object detection apparatus and method employed to accurately detect moving objects using a video captured by a video capture device.

Aspects of the present invention also provide a people detection apparatus and method employed to accurately detect human moving objects among detected moving objects in a video captured by a video capture device.

Aspects of the present invention also provide a people tracking apparatus and method employed to accurately track an object of interest or a human moving object detected in a video captured by a video capture device.

Aspects of the present invention also provide a people counting apparatus and method employed to accurately count the number of people using a video captured by a video capture device.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a people counting apparatus including: a reception unit which receives a video of an area including an entrance captured by a video capture device; a line setting unit which sets an inline at the entrance and sets an outline such that a specific region is formed on a side of the inline; a detection unit which detects moving objects in the video using information differences between frames of the received video and detects human moving objects among the detected moving objects; a tracking unit which tracks the movement of each of the detected moving objects; and a counting unit which determines whether each of the moving objects passed the inline and the outline based on the tracked movement of each of the moving objects and counts the number of people based on the determination result, wherein the inline and the outline are virtual lines.

According to another aspect of the present invention, there is provided a people counting method including: receiving a video of an area including an entrance captured by a video capture device; setting an inline at the entrance and setting an outline such that a specific region is formed on a side of the inline; detecting moving objects in the video using information differences between frames of the received video and detecting human moving objects among the detected moving objects; tracking the movement of each of the detected moving objects; and determining whether each of the moving objects passed the inline and the outline based on the tracked movement of each of the moving objects and counting the number of people based on the determination result, wherein the inline and the outline are virtual lines.

According to another aspect of the present invention, there is provided a people detection apparatus including: a reception unit which receives a video frame of a video captured by a video capture device; an accuracy calculation unit which calculates the accuracy of detection for each pixel of the video frame using a Gaussian mixture model (GMM) method and a frame difference method and detects pixels whose calculated detection accuracy values are equal to or greater than a preset accuracy value as moving object regions; and a people detection unit which detects human moving objects among the detected moving objects by using positions of the detected moving object regions, sizes of the detected moving object regions, and a histogram of oriented gradient (HOG) which is a shape feature descriptor.

According to another aspect of the present invention, there is provided a people detection method including: receiving a video frame of a video captured by a video capture device; calculating the accuracy of detection for each pixel of the received video frame using a GMM method and a frame difference method and detecting pixels whose calculated detection accuracy values are equal to or greater than a preset accuracy value as moving object regions; and detecting human moving objects among the detected moving objects by using positions of the detected moving object regions, sizes of the detected moving object regions, and a HOG which is a shape feature descriptor.

BRIEF DESCRIPTION OF THE DRAWINGS

The above and other aspects and features of the present invention will become more apparent by describing in detail exemplary embodiments thereof with reference to the attached drawings, in which:

FIG. 13 is a flowchart illustrating a people detection method according to an embodiment of the present invention; and FIG. 14 is a flowchart illustrating a people counting method according to an embodiment of the present invention.

DETAILED DESCRIPTION OF THE INVENTION

Figure 1:
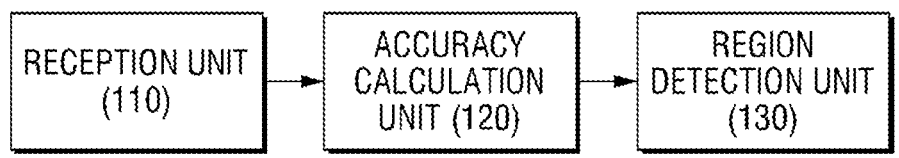
FIG. 1 is a block diagram of a moving object detection apparatus according to an embodiment of the present invention.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

The present invention can count the number of people entering or leaving a place through an entrance by using a video of the entrance captured by a video capture device such as a closed circuit television (CCTV).

Specifically, the present invention can accurately detect moving objects in a noise-resistant manner in each frame of a video captured by a video capture device using a Gaussian mixture model (GMM) method, which is a long-term background recognition technique, and a frame difference method which is a short-term motion detection technique.

The present invention can also detect human moving objects among detected moving objects using a histogram of oriented gradient (HOG), which is a shape feature descriptor, and position and size information of the detected moving objects.

In addition, the present invention can track a detected human moving object using a Kalman filter, template matching, and scale invariant feature transform (SIFT).

Furthermore, the present invention can count the number of people entering or leaving a place through an entrance without being affected by noise in its performance of detecting and tracking moving objects by calculating a probability using Bayes' Rule.

Hereinafter, the present invention will be described in more detail reference to the attached drawings.

FIG. 1 is a block diagram of a moving object detection apparatus 100 according to an embodiment of the present invention.

Conventional moving object detection methods include a background subtraction method that uses the difference in brightness between the background and an object and the frame difference method that detects motions from the difference between two successive image frames.

The background subtraction method is used to detect moving objects. If the background is complicated and changes significantly, how accurately the background is learned in real time may determine the accuracy of object detection. The GMM method is used to model the background and uses a probabilistic learning method. The brightness distribution of each pixel in an image is approximated using the GMM, and whether a measured pixel belongs to the background or an object is determined using an approximated model variable value.

The GMM based on long-term learning is robust to noise such as a shadow that instantly appears and then disappears or a change in light. In some cases, however, the GMM wrongly determines a moving object to be noise. On the other hand, the frame difference method sensitively senses a moving object. However, the frame difference method also sensitively senses various noises and fails to sense slow motions.

The moving object detection apparatus 100 according to the current embodiment calculates the accuracy of detection using both the GMM method and the frame difference method. The calculated accuracy of detection and the priority-based region expansion of a region detection unit 130 enable the moving object detection apparatus 100 to detect moving objects more accurately than the conventional methods.

The moving object detection apparatus 100 according to the current embodiment can detect moving objects accurately and in a noise-resistant manner in each frame of a video captured by a video capture device by using the GMM method which is a long-term background recognition technique and the frame difference method which is a short-term motion detection technique. Detecting moving objects is a process that must take precedence in order to count the number of people. Therefore, the accuracy of detecting moving objects is one of the important factors that can guarantee the accuracy of counting the number of people.

Referring to FIG. 1, the block diagram of the moving object detection apparatus 100 according to the current embodiment may include a reception unit 110, an accuracy calculation unit 120, and the region detection unit 130.

The reception unit 110 may receive and store a video captured by a video capture device such as a CCTV.

The accuracy calculation unit 120 calculates the accuracy of each pixel in a frame of the video received by the reception unit 110.

Specifically, the accuracy calculation unit 120 may calculate the accuracy of detection using the GMM method and the frame difference method.

More specifically, the accuracy calculation unit 120 may calculate the accuracy of detection using Equation (1):

$$a(x,y) = a_g(x,y) + a_f(x,y),\qquad(1)$$

where (x,y) represents the position of a pixel in a frame. In Equation (1), a(x,y) represents the accuracy of each pixel located at (x,y) in each frame of a captured video. That is, in the GMM method, the higher the probability calculated by $a_g(x,y)$, the higher the accuracy. In the frame difference method, the greater the difference between pixels located at the same positions in different frames, the higher the accuracy. A pixel having a high accuracy value is hardly likely to be noise and highly likely to be a moving object. Conversely, a pixel having a low accuracy value is highly likely to be noise and hardly likely to be a moving object.

In addition, $a_g(x,y)$ and $a_f(x,y)$ may be defined by Equation (2) and Equation (3), respectively:

$$a_g(x, y) = \frac{1}{2}\left\{1 - \sum_{i=1}^{K}\left(\varpi_i * \frac{1}{\sqrt{2\pi}\,\sigma_i}\exp\left[-\frac{(I(x, y) - \mu_i)^2}{2\sigma_i^2}\right]\right)\right\},\qquad(2)$$

$$a_f(x, y) = \frac{1}{2}(1 - \exp[-\|I_t(x, y) - I_{t-1}(x, y)\|^2]).\qquad(3)$$

Equation (2) uses the GMM method and is a probabilistic model that defines brightness changes at a position (x,y) in f frames by using K Gaussian models. Here, f and K may vary according to environment. For example, f may be set to 100, and K may be set to 3. Therefore, $a_g(x,y)$ in Equation (2) defines a brightness model of the background. When a new frame is received, the probability that the brightness of a pixel located at (x,y) will be an object may be calculated based on the defined model. In Equation (2), $\mu_i$ is the average of an $i^{th}$ Gaussian model, and $\sigma_i$ is the variance of the $i^{th}$ Gaussian model. In addition, I(x,y) is a brightness value of a pixel located at (x,y), and $\overline{w}_i$ is a weight parameter that is used in the GMM method and that can be defined by learning. The accuracy calculation unit 120 may output a low accuracy value if a probability calculated using Equation (2) is low and output a high accuracy value if the probability calculated using Equation (2) is high.

In Equation (3), $I_t(x,y)$ represents a brightness value of a pixel located at (x,y) in a $t^{th}$ frame. That is, when a new frame is received by the reception unit 110, the accuracy calculation unit 120 may calculate a difference in brightness between pixels at the same positions in a previous frame and the new frame. Then, the accuracy calculation unit 120 may output a low accuracy value if the brightness difference is small and output a high accuracy value if the brightness difference is large.

Therefore, if Equation (1) is described using Equations (1) and (2), the accuracy calculation unit 120 may detect a pixel as a moving object if the calculated accuracy indicates that the pixel is neither the background nor noise. To detect moving objects, the accuracy calculation unit 120 may set an appropriate reference accuracy value Th1. The reference accuracy value Th1 may vary according to environment such as image resolution, situation, operation processing speed, etc.

The accuracy calculation unit 120 may calculate the accuracy a(x,y) in Equation (1) as a value between zero and one by using Equations (2) and (3).

The region detection unit 130 may normalize the accuracy a(x,y) such that a maximum value of the accuracy a(x,y) is one and may define a pixel having a value of one as a reference pixel. The region detection unit 130 may define a priority π(p) as in Equation (4) below. When a value of the priority π(p) is equal to or greater than a set threshold value $T_\tau$, the region detection unit 130 may expand a region. When priority values of all pixels are less than the set threshold value $T_\tau$, the region detection unit 130 may stop region expansion and detect a moving object region:

$$\pi(p) = \sum_{q \in N_p} a(q)e^{\tau(p,q)}.\qquad(4)$$

Equation (4) is an example of an equation that defines the priority π(p), p represents a pixel located at (x,y), and q represents pixels neighboring the pixel p in four directions (up, down, left and right). In addition, τ(p,q) may be defined by Equation (5):

$$\tau(p, q) = \begin{cases} 0, & \text{if } \|I(p) - I(q)\|^2 < T_\tau \\ -\|I(p) - I(q)\|^2, & \text{otherwise} \end{cases},\qquad(5)$$

where I(p) represents a brightness value at a position p, I(q) represents a brightness value at a position q, and $T_\tau$ is a threshold value that varies according to situation.

FIGS. 2A through 2D are diagrams for explaining an example of the result of detecting a moving object using the moving object detection apparatus 100 of FIG. 1.

The results of detecting a moving object using the conventional moving object detection methods and the result of detecting a moving object using the moving object detection apparatus 100 of FIG. 1 will now be compared with reference to FIGS. 2A through 2D.

Figure 2A:
FIGS. 2A through 2D are diagrams for explaining an example of the result of detecting a moving object using the moving object detection apparatus of FIG. 1.
Figure 2B:
Figure 2C:
Figure 2D:

Specifically, FIG. 2A illustrates the result of detecting a moving object using the conventional GMM method, and FIG. 2B illustrates the result of detecting the moving object using the conventional frame difference method. FIG. 2C illustrates the result of detecting the moving object based on accuracy calculated by the accuracy calculation unit 120 of the moving object detection apparatus 100 of FIG. 1. FIG. 2D illustrates the result of detecting the moving object by applying priority-based region expansion to the result of FIG. 2C using the region detection unit 130 of the moving object detection apparatus 100 of FIG. 1.

In FIG. 2C, dots whose accuracy values calculated by the accuracy calculation unit 120 are equal to or greater than a preset accuracy value Th1 are expressed. The preset accuracy value Th1 may vary according to the environment of a system employing the moving object detection apparatus 100 of FIG. 1. Referring to FIGS. 2A through 2C, it can be understood that the moving object shown in FIG. 2C has been detected more clearly and accurately than those shown in FIG. 2A or FIG. 2B. FIG. 2D shows the result of applying priority-based region expansion to the result of FIG. 2C. It can be understood that the moving object shown in FIG. 2D has been detected more clearly and accurately than those shown in FIGS. 2A through 2C.

Figure 3:
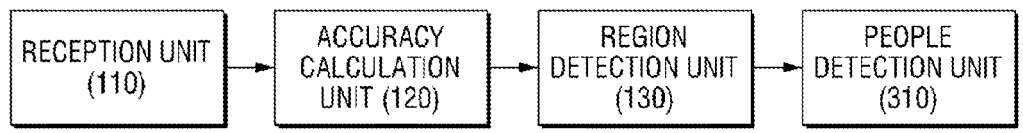
FIG. 3 is a block diagram of a people detection apparatus according to an embodiment of the present invention.

FIG. 3 is a block diagram of a people detection apparatus 300 according to an embodiment of the present invention.

People can be counted only after they are detected among detected moving objects. The people detection apparatus 300 according to the current embodiment can detect human moving objects among moving objects detected in a frame.

Referring to FIG. 3, the people detection apparatus 300 according to the current embodiment includes a people detection unit 310 in addition to the components of the moving object detection apparatus 100 of FIG. 1.

The people detection unit 310 may detect human moving objects among detected moving objects using a location scale-based HOG (LSHOG) descriptor.

The LSHOG descriptor takes into account position information of moving objects detected by the moving object detection apparatus 100 of FIG. 1 and size information of the detected moving objects in addition to a HOG which is a shape feature descriptor. The moving object detection apparatus 100 of FIG. 1 can detect a moving object region more accurately than conventional detection methods as shown in FIGS. 2A through 2D. Therefore, the people detection unit 310 can more accurately detect people among moving objects using the LSHOG descriptor than conventional detection methods using the HOG.

For example, if detected moving objects are two or more people located close to each other or overlapping each other, there may be a problem in detecting the people. To solve this problem, the HOG which is a shape feature descriptor may be used.

Figure 4A:
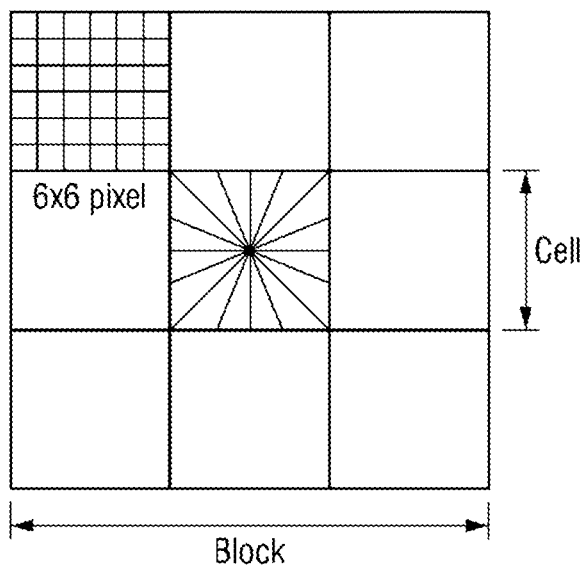
FIG. 4A is a diagram illustrating an example of the result of calculating a gradient in m directions in n×n blocks by using a gradient histogram.
Figure 4B:
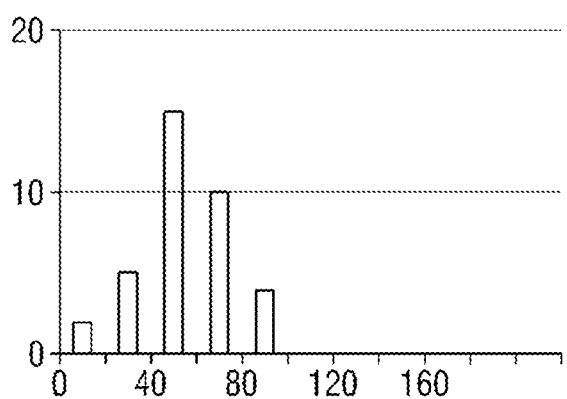
FIG. 4B is a diagram illustrating an example of a histogram constructed based on gradients calculated using a gradient histogram.

The HOG may calculate gradients in m directions in n×n blocks as illustrated in FIG. 4A and form a histogram as illustrated in FIG. 4B according to direction. Specifically, if 8×8 BIN are used, if gradients are calculated in nine directions, and if the block size is set to 64×64, the HOG descriptor may consist of 576-dimensional vectors. However, since the HOG expresses shape features, an object can be recognized only at a fixed position due to perspective distortion that occurs depending on the position of the object.

To overcome this limitation, the people detection apparatus 300 of FIG. 3 uses an LSHOG descriptor consisting of 579-dimensional vectors in addition to the position and size information of detected moving object regions. Here, 579 dimensions are merely an example. If the HOG descriptor consists of D-dimensional vectors, the LSHOG descriptor used in the present invention may consist of (D+2)-dimensional vectors in addition to the position and size information of the detected moving object regions.

Specifically, the people detection unit 310 may establish a database of right and wrong answers using the LSHOG descriptor and detect human moving objects by applying nonlinear support vector machine (SVM) or random forest classification.

Figure 5:
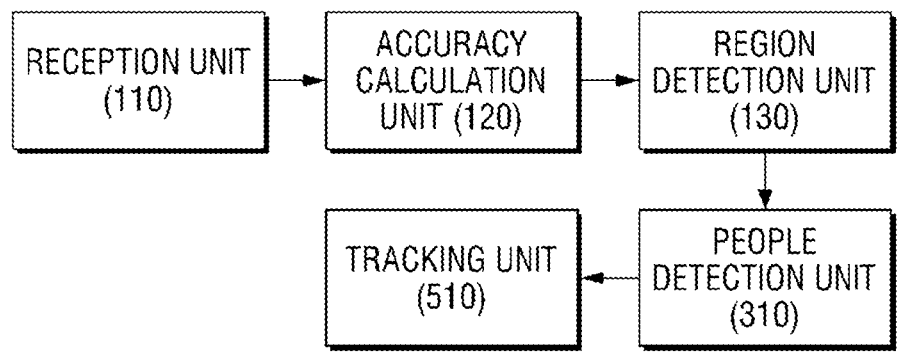
FIG. 5 is a block diagram of a people tracking apparatus according to an embodiment of the present invention.

FIG. 5 is a block diagram of a people tracking apparatus 500 according to an embodiment of the present invention.

The people tracking apparatus 500 according to the current embodiment may track detected human moving objects using the Kalman filter, template matching, and the SIFT.

Specifically, referring to FIG. 5, the people tracking apparatus 500 according to the current embodiment includes a tracking unit 510 in addition to the components of the people detection apparatus 300 of FIG. 3.

In order to reduce errors caused by an occluded region and various noises and accurately track objects, the tracking unit 510 may track an object of interest detected in a video using a weight $w_d$ based on the accuracy of the object detected by the Kalman filter.

The Kalman filter estimates a predictive value by estimating a measurable variable and a predictive variable and is a method of tracking position and data by calculating a weight according to standard deviation.

Specifically, the tracking unit 510 may track moving people detected by the people detection apparatus 300 of FIG. 3 using Equation (6):

$$x_t = (1-K)(1-w_d)\bar{x}_t + (K-w_d+w_dK)\hat{x}_t \quad (6).$$

Referring to Equation (6), the tracking unit 510 may track a detected moving person (object) in a video by using a Kalman filter including a Kalman gain K and the weight $w_d$ which is based on the accuracy of the detected object. In Equation (6), $x_t$ represents the predicted position information of a moving person in a $t^{th}$ frame. Here, $x_t$ can be inferred from $\bar{x}_t$ predicted from $x_{t-1}$ in a $(t-1)^{th}$ frame immediately before the $t^{th}$ frame as well as from a detected position $\hat{x}_t$. In addition, K represents the Kalman gain, and $w_d$ represents a weight based on the detection accuracy of an object. Specifically, $w_d$ represents a weight based on the detection accuracy of a person detected by the people detection apparatus 300 of FIG. 3.

More specifically, the people detection apparatus 300 of FIG. 3 may detect the position of a moving object using template matching, and $w_d$ may be defined by Equation (7):

$$w_d = \beta_{template}\alpha_{template} + \beta_{histogram}\alpha_{histogram} + \beta_{SIFT}\alpha_{SIFT}, \quad (7)$$

where β is an accuracy weight for each of $\alpha_{template}$, $\alpha_{histogram}$, and $\alpha_{sift}$. For example, $\beta_{template}$ may be set to 0.7, $\beta_{histogram}$ may be set to 0.1, and $\beta_{sift}$ may be set to 0.2. Each weight may vary according to the operating system environment of the present invention. Accuracy not applied due to constraints on the amount of calculation may be set to zero, and $\alpha_{template}$ may be defined by Equation (8):

$$\alpha_{template} = \exp[-SAD(x_t, x_{t-1})] \quad (8).$$

In Equation (8), SAD is the abbreviation of sum of absolute differences. That is, in Equation (8), $SAD(x_t, x_{t-1})$ is the sum of absolute values of differences between pixel values in templates having $x_t$ and $x_{t-1}$ at their centers. A template may denote a block and may be the same as a block of a block matching algorithm (BMA) used in video compression such as H.26x, MPEG, etc.

The tracking unit 510 may calculate the accuracy $\alpha_{histogram}$ of Equation (7) according to the amount of calculation allowed in the operating system environment of the present invention. To calculate $\alpha_{histogram}$, a probabilistic model is defined by applying the GMM to a color histogram of an object of interest in templates, and then a difference between histograms of the templates is calculated. That is, $\alpha_{histogram}$ may be the difference between matching template histograms of previous and current frames.

Additionally, the tracking unit 510 may calculate the accuracy $\alpha_{sift}$ of Equation (7) according to the amount of calculation allowed in the operating system environment of the present invention. Here, $\alpha_{sift}$ may be a difference between the same object in previous and current frames calculated using a feature descriptor (such as a brightness value vector in a block) in the SIFT. The same object in the previous and current frames may be a block covering an object in the case of a template.

As mentioned above with reference to Equation (7), accuracy not applied due to constraints on the amount of calculation may be set to zero. That is, whether to apply the accuracy $\alpha_{histogram}$ and the accuracy $\alpha_{sift}$ may be determined based on the amount of calculation allowed.

Figure 6:
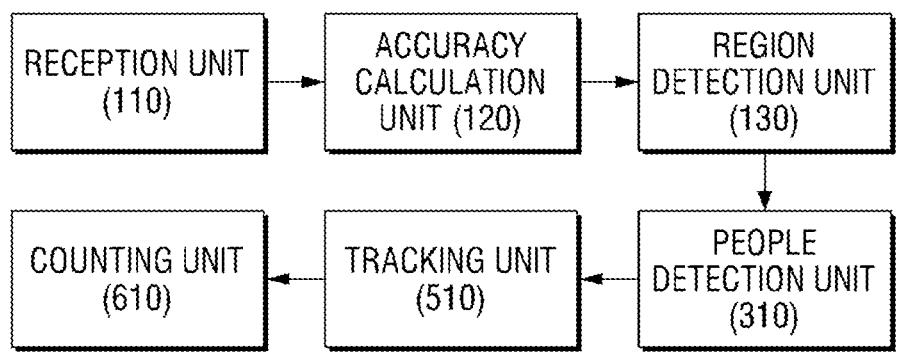
FIG. 6 is a block diagram of a people counting apparatus according to an embodiment of the present invention.

FIG. 6 is a block diagram of a people counting apparatus 600 according to an embodiment of the present invention.

Referring to FIG. 6, the people counting apparatus 600 according to the current embodiment includes a counting unit 610 in addition to the components of the people tracking apparatus 500 of FIG. 5.

The counting unit 610 counts the number of people using a probability in order to produce the result of counting people regardless of the confusing detection of moving objects and the performance of the tracking unit 510.

Figure 7:
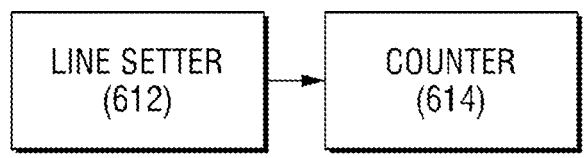
FIG. 7 is a block diagram of a counting unit included in the people counting apparatus of FIG. 6.

Referring to FIG. 7, the counting unit 610 may include a line setter 612 and a counter 614.

The line setter 612 may set an inline at an entrance and set an outline such that a specific region is formed on a side of the inline outside the entrance.

The entrance does not necessarily have a door, and various forms of entrance such as the entrance to a subway station may exist. In addition, the entrance may be a passing region for distinguishing the entry and exit of people. A region for distinguishing the entry and exit of people may be referred to as a passing region. That is, the entrance is not limited to a particular form. The passing region is not necessarily a region having an area but may also be a line. Throughout the Detailed Description of the Invention, a region for distinguishing the entry and exit of people will be referred to as an 'entrance' instead of a 'passing region' in order to help understand the present invention. That is, the 'entrance' is one of the criteria for determining entry or exit, such as social and customary concept, a user's setting, and an automatic door.

The size of the inline set at the entrance may be equal to or a little greater than the size of the entrance. In addition, the inline may be set at a predetermined distance from the entrance. The inline and the outline are virtual lines and may be set to be visible in an image. A region formed by the inline and the outline may vary according to a user's setting, the form of the entrance, the mobility of population, the size of the entrance, etc. The inline and the outline may be set such that the intention to enter or leave a place can be clearly identified.

A specific region formed by the inline and the outline may be quadrilateral. However, the specific region is not limited to the quadrilateral shape and may also have various polygonal shapes. The specific region formed by the inline and the outline may be located outside and/or inside the entrance. The outside and inside of the entrance may be set based on social concept. In an example, if the entrance is an automatic door of a building, the outside of the building may be considered as the outside of the entrance, and the inside of the building may be considered as the inside of the entrance. In another example, if the entrance is an entrance to a subway station, stairs or an escalator descending to the subway station may be considered as the inside of the entrance, and the sidewalk outside the subway station may be considered as the outside of the entrance.

To count the number of people leaving a place through the entrance, the line setter 612 may set the inline and the outline such that the specific region is formed in a region through which people intending to leave the place through the entrance should pass. That is, to count the number of people leaving the place through the entrance, the line setter 612 may set the outline outside the entrance.

Conversely, to count the number of people entering the place through the entrance, the line setter 612 may set the inline and the outline such that the specific region is formed in a region through which people intending to enter the place through the entrance should pass. That is, to count the number of people entering the place through the entrance, the line setter 612 may set the outline inside the entrance.

The counter 614 may count the number of people using the set inline and outline. That is, the counter 614 may count the number of human moving objects who passed the set inline and then the set outline as the number of people entering or leaving the place.

Specifically, if the line setter 612 sets the inline and the outline such that the specific region is set outside the entrance, the counter 614 may increase the number of people (Out count) leaving the place by one when a human moving object detected and tracked in a video passes the inline and then the outline.

Conversely, if the line setter 612 sets the inline and the outline such that the specific region is set inside the entrance, the counter 614 may increase the number of people (In count) entering place by one when a human moving object detected and tracked in a video passes the inline and then the outline.

Specifically, even if a moving object passes the outline after passing the inline several times, the counter 614 may increase the number of people leaving or entering the place by only one. Whether a moving object has passed the inline and/or the outline may be determined using the moving object detection apparatus 100 of FIG. 1, the people detection apparatus 300 of FIG. 3, and the people tracking apparatus 500 of FIG. 5. That is, if a moving object located on a side of the inline is found to be located the other side of the inline after a certain period of time based on information about the moving object detected and tracked by the moving object detection apparatus 100 of FIG. 1, the people detection apparatus 300 of FIG. 3 and the people tracking apparatus 500 of FIG. 5, it may be determined that the same moving object has passed the inline. Likewise, if a moving object located on a side of the outline is found to be located the other side of the outline after a certain period of time based on information about the moving object detected and tracked by the moving object detection apparatus 100 of FIG. 1, the people detection apparatus 300 of FIG. 3 and the people tracking apparatus 500 of FIG. 5, it may be determined that the same moving object has passed the outline.

After a human moving object detected and tracked in a video passes the inline, it may move within a space formed by the inline and the outline and then pass the inline again. In this case, the counter 614 may not count the human moving object as a person leaving or entering a place. After a human moving object passes the inline, it may move in the space formed by the inline and the outline and then pass the outline. Only in this case, the counter 614 may count the human moving object as a person leaving the place.

In a conventional method, whether a human moving object detected and tracked in a video enters or leaves a place is determined based on one line or two lines. However, in this conventional method, even if a person moves variously but does not actually leave or enter a place, the person is counted as a person leaving or entering the place. For example, if a person moves around an entrance, the person is highly likely to be wrongly counted as a person entering or leaving a place several times in the conventional method using one line or two lines.

Figure 8:
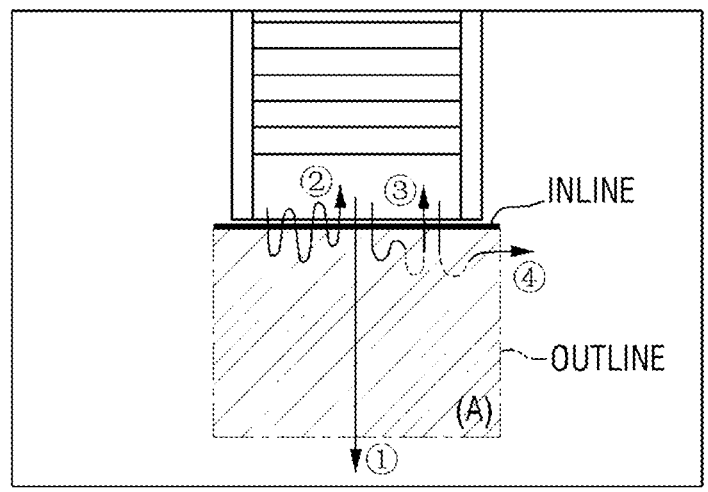
FIG. 8 is a diagram illustrating a method of counting the number of people leaving a place by using the counting unit in a case where a line setter of the people counting apparatus of FIG. 6 sets a specific region outside an entrance.

FIG. 8 is a diagram illustrating a method of counting the number of people leaving a place by using the counting unit 610 in a case where the line setter 612 of the people counting apparatus 600 of FIG. 6 sets a specific region outside an entrance.

Specifically, the way the counter 614 counts the number of people leaving a place using an inline and an outline more accurately than a conventional method will now be described with reference to FIG. 8.

Referring to FIG. 8, in a conventional method using only one line (e.g., an inline), a moving object ① can be counted relatively accurately. It will be assumed that a 'moving object' used below to describe the present invention is a person.

However, a moving object ② which moves around the line and moving objects ③ and ④ which are detected and tracked with low accuracy or the tracking of which used to be stopped cannot be counted accurately using the conventional method.

In the conventional method, the moving object ② may be counted as having entered a place three times and left the place three times. However, although the moving object ② intended to leave the place, it did not actually leave the place. Therefore, the moving object ② should be counted as having entered or left the place zero times.

In addition, the moving object ③ may be counted as having left the place once in the conventional method. However, although the moving object ③ intended to leave the place, it actually entered the place again instead of leaving the place. The moving object ④ may be counted as having left the place twice and entered the place once in the conventional method. However, the moving object ④ actually left the place after conflicting whether to leave or enter the place.

Unlike the conventional method, the people counting apparatus 600 of FIG. 6 counts only a moving object which passed an inline and then an outline as a person leaving a place. In addition, even if the moving object is detected and tracked unclearly due to, e.g., noise, the people counting apparatus 600 of FIG. 6 does not take into account the movement of the moving object within a hatched region A formed by the inline and the outline. Instead, the people counting apparatus 600 counts the moving object as a person entering the place only when the moving object passes the inline and then the outline.

That is, even if it is difficult to detect and track a moving object because the moving object changes its direction rapidly, the counter 614 according to the present invention can accurately count the number of people leaving or entering a place as compared with the conventional method. Detecting a moving object and tracking the detected moving object may be performed using the people detection apparatus 300 of FIG. 3 and the people tracking apparatus 500 of FIG. 5.

Specifically, since the moving object ① was detected and tracked as having passed the inline and then outline, the counter 614 may increase the number of people leaving a place by one. The moving object ② was detected and tracked as having passed the inline but not the outline, the counter 614 may not increase the number of people leaving the place.

In the case of the moving object ③, there was a time (e.g., a dotted portion in the path of the moving object ③ in FIG. 8) when data about the detection and tracking of the moving object ③ did not exist due to noise. Even in this case, if the moving object ③ was detected and tracked as having passed the inline and not passed the outline but passed the inline again, the counter 614 may not increase the number of people leaving the place.

Like the moving object ③, in the case of the moving object ④, there was a time (a dotted portion in the path of the moving object ④ in FIG. 8) when data about the detection and tracking of the moving object ④ did not exist due to noise. Even in this case, if the moving object ④ was detected and tracked as having passed the inline and then the outline, the counter 614 may increase the number of people leaving the place by one.

Figure 9:
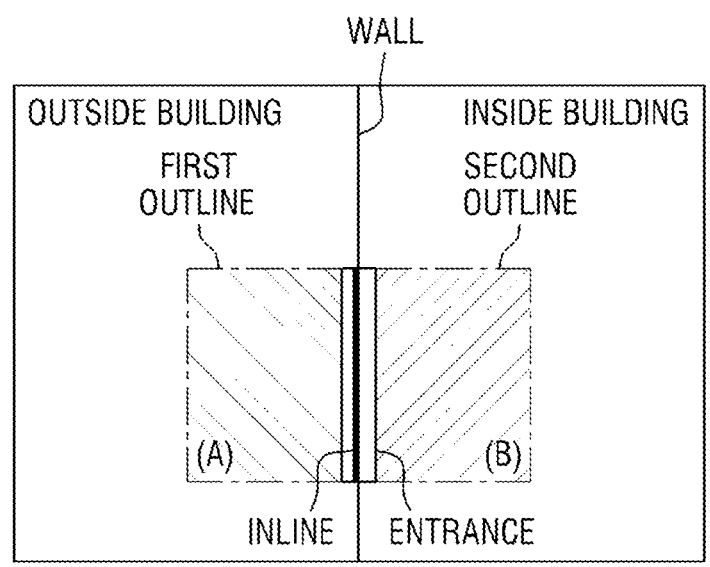
FIG. 9 is a diagram illustrating a method of counting the number of people entering a place by using the counting unit in a case where the line setter of the people counting apparatus of FIG. 6 sets a specific region inside an entrance.

FIG. 9 is a diagram illustrating a method of counting the number of people entering a place by using the counting unit 610 in a case where the line setter 612 of the people counting apparatus 600 of FIG. 6 sets a specific region inside an entrance.

Referring to FIG. 9, the line setter 612 may set an inline near an entrance and set an outline such that a specific region B is formed inside the entrance.

The counting unit 610 may count moving objects which passed the inline and then the outline as people entering a place among moving objects detected and tracked by the line setter 612. That is, in FIG. 9, moving objects ⓐ and ⓑ which passed the inline and then the outline may be counted as people entering the place, and moving objects ⓒ and ⓓ which passed the inline but not passed the outline may not be counted as people entering the place.

Referring back to FIG. 6, the line setter 612 may set a first inline and a second outline in order to set a specific region inside the entrance and may set a second inline and a second outline in order to set a specific region outside the entrance. The line setter 612 may set the first inline and the second inline as the same line or different lines.

Figure 10:
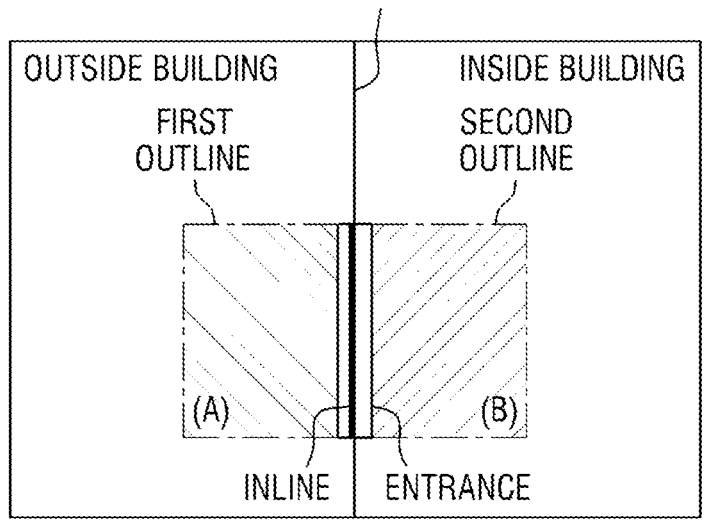
FIG. 10 is a diagram illustrating an example of setting an inline and an outline using the line setter such that a specific region is formed inside and outside an entrance.

FIG. 10 is a diagram illustrating an example of setting an inline and an outline using the line setter 614 such that a specific region is formed inside and outside an entrance.

If the line setter 612 sets an inline and first and second outlines as illustrated in FIG. 10, the counting unit 610 may count a moving object which passed the inline and then the first outline as a person leaving a place and count a moving object which passed the inline and then the second outline as a person entering the place.

Figure 11:
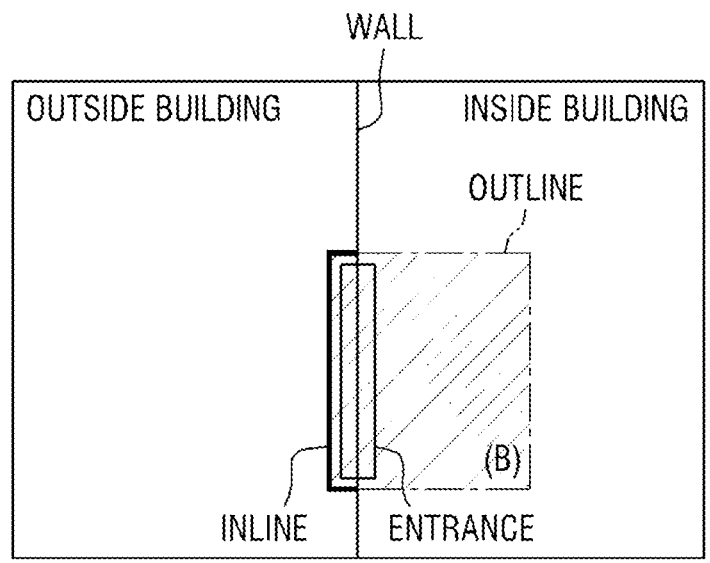
FIG. 11 is a diagram illustrating another example of setting lines using the line setter.
Figure 12:
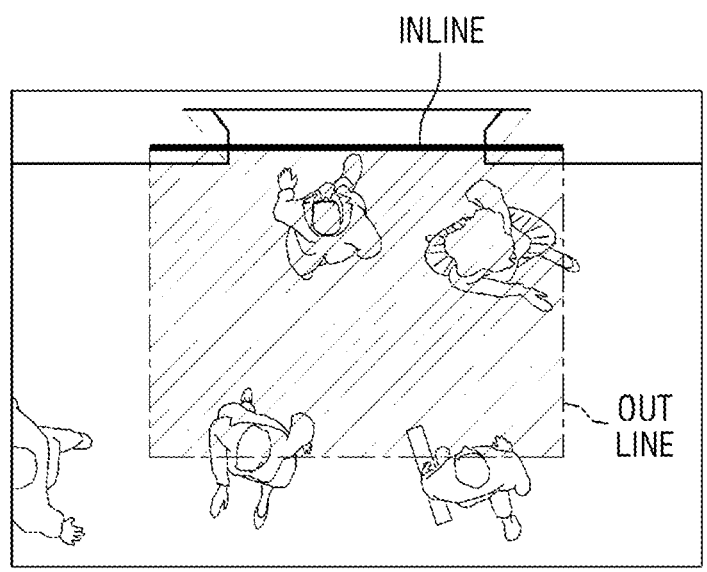
FIG. 12 is a diagram illustrating an example of setting a line on a video captured by a video capture device.

FIG. 11 is a diagram illustrating another example of setting lines using the line setter 612.

Referring to FIG. 11, if the line setter 612 sets an outline such that a specific region is formed inside an entrance, an inline can exist outside the entrance. Even if the inline exists outside the entrance, the outline may exist inside the entrance, and a wide specific region may be formed inside the entrance by the inline and the outline. Even if the inline and the outline are set as illustrated in FIG. 10, the counting 610 may count the number of people leaving a place in the same way as described above.

Conversely, if the line setter 612 sets an outline such that a specific region is formed outside an entrance, an inline can exist inside the entrance. Even if the inline exists inside the entrance, the outline may exist outside the entrance, and a wide specific region may be formed outside the entrance by the inline and the outline.

Various examples of setting an inline and an outline using the line setter 612 have been described above with reference to FIGS. 8 through 12. The line setter 612 may also set a line on a video captured by a video capture device such as a CCTV.

Specifically, a method of counting the number of people using the counter 614 based on whether each person has passed an inline and an outline will be described with reference to Equations (9) through (12).

The counter 614 may count the number of people using a probability p(S|X) expressed by Bayes' Rule. The probability p(S|X) is given by Equation (9):

$$p(S \mid X) = \frac{p(X \mid S)p(S)}{p(X)}. \tag{9}$$

In Equation (9), p(S|X) represents a probability that a state S will belong to one of 'In count', 'Out count', and 'Not count' when a trajectory X is given. In count indicates an entering situation, Out count indicates a leaving situation, and Not count indicates an uncounted situation. In Equation (9), a value of p(S) may be preset. For example, assuming that the number of people entering a place is equal to the number of people leaving the place, p(S=In count) may be set to 0.4, and p(S=Out count) may be set to 0.4. The value of p(S) may vary according to the operating system environment of the present invention, a place captured by a CCTV, etc.

As described above, when a moving object passes an outline and then an inline, In count is increased by one. In addition, when a moving object passes the inline and then the outline, Out count is increased by one. Not count may indicate all situations excluding the entering and leaving situations.

The trajectory X denotes $\{x_0, x_1, \ldots, x_{t-1}, x_t\}$, where $x_t$ is position information of a moving person predicted and tracked in a $t^{th}$ frame. Therefore, the trajectory X is a set of $x_t$ in frames. p(S|X=IN) may be given by Equation (10):

$$p(X \mid S=IN) = p(x_t \mid S=IN) \cdot p(x_0 \mid S=IN). \tag{10}$$

Referring to Equation (10), the counter 614 may count the number of people using a position $x_0$ detected first in the trajectory X and a position $x_t$ detected last in the trajectory X. $p(x_t|S=IN)$ and $p(x_0|S=IN)$ in Equation (10) will be described in more detail using Equation (11) and Equation (12), respectively.

Specifically, when the detected position $x_t$ is given, a probability that a person entered a place may be defined by Equation (11):

$$p(x_t \mid S=IN) = \begin{cases} \alpha_{in} & \text{if } x_t \text{ is located on Outline} \\ 0 & O/W \end{cases} \tag{11}$$

In Equation (11), $\alpha_{in}$ is a probability value in a case where $x_t$ exists on an outline and may be set experimentally. For example, $\alpha_{in}$ may be set to a value equal to or greater than 0.7. $p(x_0|S=IN)$ may be defined by Equation (12):

$$p(x_0 \mid S=IN) = \begin{cases} \beta_{in} & \text{if } x_0 \text{ is located on Inline} \\ 0 & \text{if } x_0 \text{ is located on Outline} \\ \dfrac{\left|\sum_i^t \Delta y_i\right|}{L} \cdot \gamma & O/W \end{cases} \tag{12}$$

In Equation (12), $|\Sigma_i^t \Delta y_i|$ represents the sum of y-axis gradients of a trajectory X, and L represents a y-axis length of a counting region. In addition, a value of $\beta_{in}$ may be determined experimentally. For example, $\beta_{in}$ may be set experimentally to a value equal to or greater than 0.9. A value of $\gamma$ may be zero if the sum of the y-axis gradients is a negative number and may be one if the sum of the y-axis gradients is a positive number.

If p(S=IN|X)>0 and p(S=IN|X)/p(S=NOT|X)>T, the counter 614 increases In Count. Here, p(S=NOT|X) is given by 1−p(S=IN|X)−p(S=OUT|X). Assuming that p(X) is a value greater than zero, since the value exists in both a denominator and a numerator, it may be a variable that can be offset. T may be set according to the operating system environment of the present invention and may be set to, e.g., approximately 0.3.

The moving object detection apparatus 100 of FIG. 1 can accurately detect moving objects in a frame of a video captured by a video capture device.

The people detection apparatus 300 of FIG. 3 can accurately detect people among the moving objects detected in the frame of the video captured by the video capture device.

The people tracking apparatus 500 of FIG. 5 can accurately track the moving objects detected in the frame of the video captured by the video capture device.

The people counting apparatus 600 of FIG. 6 can count, with high accuracy, the number of human moving objects detected and tracked using the video captured by the video capture device.

The people counting apparatus 600 of FIG. 6 counts the number of people using an inline and an outline. Therefore, the people counting apparatus 600 of FIG. 6 can count the number of people with high accuracy as compared with a conventional method of counting the number of people using only one line.

FIG. 13 is a flowchart illustrating a people detection method according to an embodiment of the present invention.

Referring to FIG. 13, the reception unit 110 may receive a video frame of a video of an area including an entrance captured by a video capture device (operation S1310).

The accuracy calculation unit 120 may calculate the accuracy of detection for each pixel of the video frame received by the reception unit 110 by using a GMM method and a frame difference method and detect pixels whose calculated detection accuracy values are equal to or greater than a preset accuracy value as moving object regions (operation S1320).

The region expansion unit 130 may expand the moving object regions detected by the accuracy detection unit 120 based on a priority π(p) that uses a difference in brightness between the pixels (operation S1330). A detailed description of the priority π(p) can be found in the description of FIGS. 4 and 5.

The people detection unit 310 may detect human moving objects among the detected moving objects by using positions of the moving object regions expanded by the region expansion unit 130, sizes of the moving object regions expanded by the region expansion unit 130, and a HOG which is a shape feature descriptor (operation S1340).

FIG. 14 is a flowchart illustrating a people counting method according to an embodiment of the present invention.

Referring to FIG. 14, the reception unit 110 may receive a video frame of a video of an area including an entrance captured by a video capture device (operation S1410).

The line setter 612 may set an inline at the entrance and set an outline such that a specific region is formed on a side of the inline, wherein the inline and the outline are virtual lines (operation S1420).

The accuracy calculation unit 120 and the region detection unit 130 may detect moving objects in the video frame received by the reception unit 110 (operation S1430), and the people detection unit 310 may detect human moving objects among the detected moving objects (operation S1440).

The tracking unit 510 may track the movement of each detected human moving object (operation S1450). Information detected and tracked in operations S1430, S1440 and S1450 may be stored in a database before or after operation S1420.

The counting unit 610 may determine whether each moving object has passed the inline and the outline based on information obtained by tracking the movement of each human moving object and count the number of people based on the determination result (operation S1460).

Specifically, if the line setter 612 sets the outline outside the entrance, the counting unit 610 may increase the number of people leaving a place only when a moving object passes the inline and then the outline. On the other hand, if the line setter 612 sets the outline inside the entrance, the counting unit 610 may increase the number of people entering the place only when a moving object passes the inline and then the outline (operation S1460).

Each component described above with reference to FIGS. 1, 3, 5, 6 and 7 may be implemented as a software component or a hardware component, such as a Field Programmable Gate Array (FPGA) or Application Specific Integrated Circuit (ASIC). However, the components are not limited to software or hardware components and may advantageously be configured to reside on the addressable storage medium and configured to execute on one or more processors. The functionality provided for in the components may be further separated into additional components, or a plurality of components may be combined into one component that performs a particular function.

The present invention can accurately detect moving objects in a frame of a video captured by a video capture device.

The present invention can also accurately detect people among the moving objects detected in the frame of the video captured by the video capture device.

The present invention can also accurately track moving people detected in the frame of the video captured by the video capture device.

The present invention can also accurately count the number of people using the video captured by the video capture device.

The present invention counts the number of people using an inline and an outline. Therefore, the present invention can count the number of people with high accuracy as compared with a conventional method of counting the number of people using only one line.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A people counting apparatus comprising:
a memory comprising computer executable instructions;
a hardware processor configured to read and execute the computer executable instructions to implement:
a reception unit configured to receive a video of an area comprising an entrance;
a line setting unit configured to set an inline at the entrance and to set an outline such that a specific region is formed on a side of the inline;
a detection unit configured to detect moving objects in the video, using both a Gaussian mixture model (GMM) method and information differences between frames of the video, to expand moving object regions based on a priority determined from a difference in brightness between pixels of the moving object regions, and to detect human moving objects among the detected moving objects by using positions of the expanded moving object regions, sizes of the expanded moving object regions, and a histogram of oriented gradient (HOG), which is a shape feature descriptor;
a tracking unit configured to track the movement of the detected moving objects; and
a counting unit configured to determine, on an object basis, whether the moving objects each pass the inline and the outline, based on the tracked movement, and to count a number of the people based on the determination result with respect to ones of the moving objects detected as the human moving objects;
wherein the inline and the outline are virtual lines.

2. The people counting apparatus of claim 1, wherein:
the line setting unit is further configured to set the outline outside the entrance, and
the counting unit counts one of the human moving objects as a person leaving through the entrance when detecting that the one of the human moving objects passed the inline and then the outline.

3. The people counting apparatus of claim 1, wherein:
the line setting unit is further configured to set the outline inside the entrance, and
the counting unit counts one of the human moving objects as a person entering through the entrance when detecting that the one of the human moving objects passed the inline and then the outline.

4. The people counting apparatus of claim 1, wherein the counting unit excludes one of the human moving objects as a person entering or leaving through the entrance when detecting that the one of the human moving objects passed the inline but not the outline.

5. The people counting apparatus of claim 1, wherein:
the detection unit comprises a moving object detection unit;
the moving object detection unit is configured to perform the detection with respect to the detected moving objects by using the video frame of the received video;
the moving object detection unit is further configured to calculate a respective accuracy of detection value, for each pixel of the video frame, using the GMM method and a frame difference method; and the moving object detection unit is further configured to detect, as the moving object regions, pixels whose respective calculated detection accuracy value is at least a preset accuracy value.

6. The people counting apparatus of claim 1, wherein:

the tracking unit tracks the detected moving objects using a Kalman filter;

the Kalman filter includes a Kalman gain and a weight having at least one of $\alpha_{template}$, $\alpha_{histogram}$, and $\alpha_{sift}$, where:

$\alpha_{template}$ is a sum of absolute values of differences between pixels values in templates, $\alpha_{histogram}$ is obtained by defining a probabilistic model by applying the GMM model to a color histogram of an object of interest in the templates and then calculating a difference between histograms of the templates, and $\alpha_{sift}$ is a difference between the same object in previous and current frames calculated using a feature descriptor in a scale invariant feature transform (SIFT) method.

7. A people counting method comprising:

receiving a video of an area comprising an entrance;

setting an inline at the entrance and setting an outline such that a specific region is formed on a side of the inline;

detecting moving objects in the video using both a Gaussian mixture model (GMM) method and information differences between frames of the video, expanding moving object regions based on a priority determined from a difference in brightness between pixels of the moving object regions, and detecting human moving objects among the detected moving objects by using positions of the expanded moving object regions, sizes of the expanded moving object regions, and a histogram of oriented gradient (HOG), which is a shape feature descriptor;

tracking movement of the detected moving objects; and determining, on an object basis, whether the moving objects each pass the inline and the outline based on the tracked movement, and counting the number of the people based on the determination result, with respect to ones of the moving objects detected as the human moving objects, wherein:

the inline and the outline are virtual lines; and at least one of the receiving, setting, detecting, tracking, and determining is performed using a hardware processor.

8. The people counting method of claim 7, further comprising:

setting the outline outside the entrance when performing the setting of the inline and the outline, and counting one of the moving objects as a person leaving through the entrance when detecting that the one of the human moving objects passed the inline and then the outline.

9. The people counting method of claim 7, further comprising:

setting the outline inside the entrance when performing the setting of the inline and the outline, and counting one of the moving objects as a person entering through the entrance when detecting that the one of the human moving objects passed the in-line and then the outline.

10. The people counting method of claim 7, further comprising excluding one of the human moving objects as a person entering or leaving through the entrance when detecting that the one of the human moving objects passed the inline but not the outline.

11. The people counting method of claim 7, wherein the detecting of the moving objects and the detecting of the human moving objects among the detected moving objects comprises:

using the video frame calculating a respective accuracy of detection value, for each pixel of the video frame, using the GMM method and a frame difference method; and detecting pixels, as the moving object regions, whose respective calculated detection accuracy value is at least a preset accuracy value.

12. A people detection method comprising:

receiving a video frame of a video;

calculating a respective accuracy value of detection for each pixel of the video frame using both a GMM method and a frame difference method;

detecting, as moving object regions, pixels whose respective accuracy values are at least a preset accuracy value;

expanding the moving object regions based on a priority determined from a difference in brightness between the pixels; and detecting human moving objects, among the moving objects, based on:

positions of the moving object regions, sizes of the moving object regions, and a histogram of oriented gradient (HOG);

wherein the HOG is a shape feature descriptor, and wherein the positions of the moving object regions are based on the expanding of the moving object regions; and wherein the sizes of the moving object regions are based on the expanding of the moving object regions.

* * * * *